Figure 1:
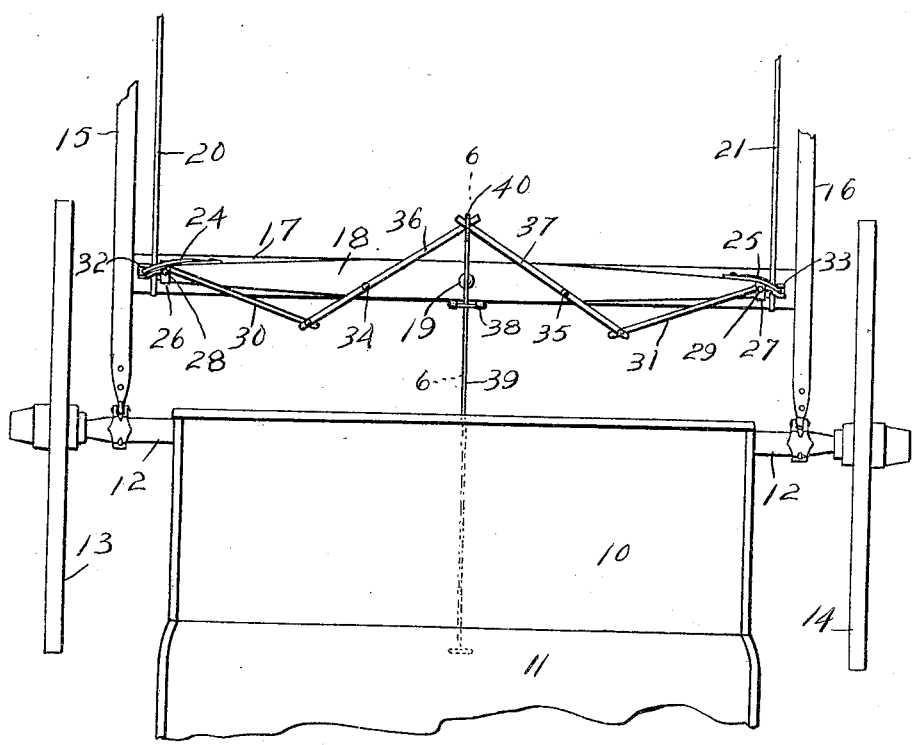

J. J. HARPER.
HORSE RELEASER.
APPLICATION FILED MAY 28, 1908.

921,987.

Patented May 18, 1909.
2 SHEETS—SHEET 1.

Witnesses
J. C. Simpson
M. F. Miller

Inventor
Jesse J. Harper.

By Chandler & Chandler
Attorneys

J. J. HARPER.
HORSE RELEASER.
APPLICATION FILED MAY 28, 1908.
921,987.
Patented May 18, 1909.
2 SHEETS—SHEET 2.
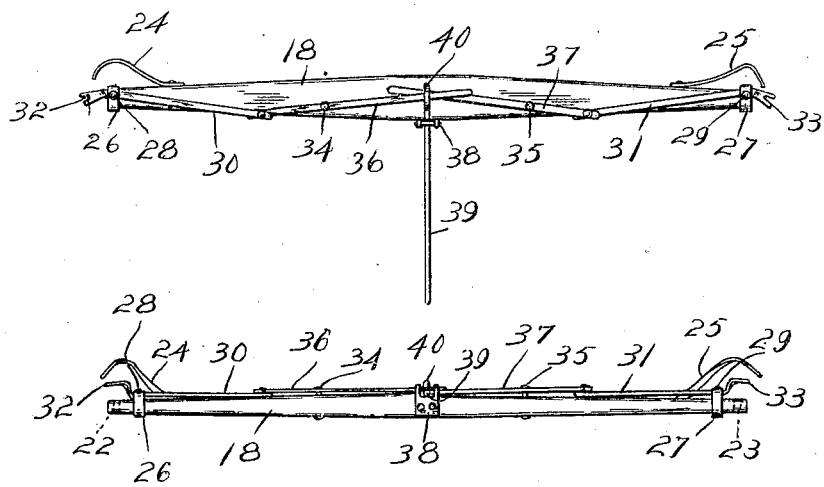
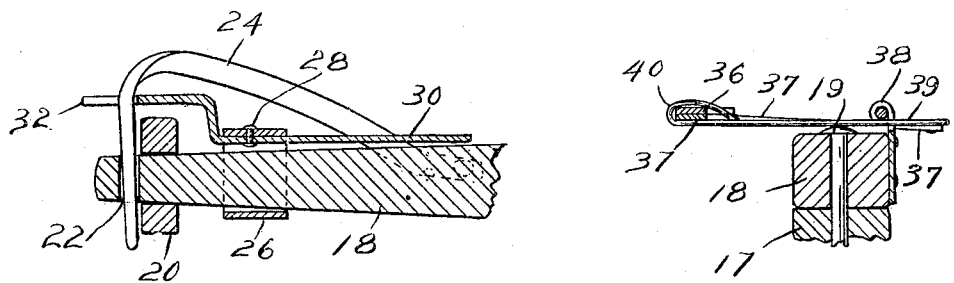
Witnesses
J. C. Simpson
M. J. Miller
Inventor
Jesse J. Harper.
By Chandler & Chandler
Attorneys

UNITED STATES PATENT OFFICE.

JESSE J. HARPER, OF QUININE, NORTH CAROLINA.

HORSE-RELEASER.

No. 921,987.  Specification of Letters Patent.  Patented May 18, 1909.

Application filed May 28, 1908. Serial No. 435,465.

*To all whom it may concern:*

Be it known that I, JESSE J. HARPER, a citizen of the United States, residing at Quinine, in the county of Randolph, State of North Carolina, have invented certain new and useful Improvements in Horse - Releasers; and I do hereby declare the following to be a full, clear, and exact description of the invention, such as will enable others skilled in the art to which it appertains to make and use the same.

This invention relates to horse releasing devices, under the control of the driver in a vehicle, whereby a horse may be instantly detached from the vehicle in event of his running away or becoming unruly, or for any other purpose.

The invention has for one of its objects to provide a simply constructed device whereby the traces or draft tugs may be forcibly dislodged from a swingle-tree by the action of the driver.

Another object of the invention is to provide a simply constructed device whereby the holding thongs and the traces may be simultaneously dislodged from the swingle-tree, such dislodging mechanism being under the control of the driver in the vehicle.

With these and other objects in view the invention consists in certain novel features of construction as hereafter shown and described and then specifically pointed out in the claims, and in the drawings illustrating the preferred embodiment of the invention.

Figure 2:
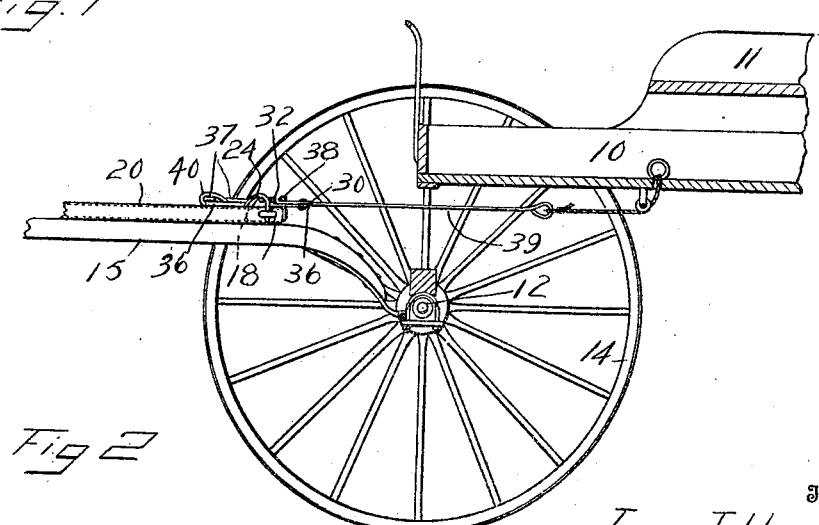

Figure 1 is a plan view of a portion of a vehicle including the swingle-tree and portions of the thills with the improved device applied. Fig. 2 is a side elevation, partly in section, of the same. Fig. 3 is a plan view of the whiffle-tree detached, with the detaching devices in trace releasing position. Fig. 4 is a rear view of the parts shown in Fig. 1 with the parts in position to receive the traces. Fig. 5 is an enlarged detail of one end of the swingle-tree, with the improved device attached. Fig. 6 is a section, enlarged, on the line 6—6 of Fig. 1.

In the drawings, a conventional vehicle is shown comprising a body 10, a seat 11, a forward axle 12 having the bearing wheels 13—14, the shafts or thills 15—16 having the usual cross bar 17 and with a swingle-tree 18 of ordinary construction pivoted at 19 to the cross bar, the outer ends of the swingle-tree adapted to receive the traces or tugs, portions of which are shown respectively at 20—21, and with the terminals of the swingle-tree provided with apertures 22—23 outside the traces, the apertures adapted to receive the free ends of flexible thongs 24—25, the inner ends of the thongs being attached in any suitable manner to the swingle-tree. This discloses the ordinary method of fastening the carriage traces to the swingle-tree, as will be obvious.

Slidably engaging the swingle-tree near their outer ends and just inside the portions that receive the traces are sleeves 26—27, and pivoted at 28—29 to these sleeves are rods 30—31, the outer ends of the rods extended beyond the sleeves and forked as at 32—33, the forked portions adapted to engage the thongs 24—25 for a purpose hereafter explained.

Pivoted at 34—35 to the swingle-tree 18 are two rods 36—37, the outer ends of the rods pivoted to the inner ends of the inner rods 30—31 and the inner ends of the inner rods 36—37 overlapping, as shown. Attached to the swingle-tree centrally thereof is a guide member 38, and extending loosely through this guide member is a pull rod 39, one terminal of the pull rod formed into a loop 40 encompassing the overlapping inner ends of the inner rods 36—37. The rod 39 is extended to the body 10 of the vehicle, and upturned to a point convenient to the hand of the driver.

With the device thus constructed and the pull rod 39 disposed in its inoperative position, the sleeves 26—27 will be maintained in their withdrawn or inoperative position, and so long as the horse is moving normally, the attachment will remain inoperative, but in event of the horse becoming unruly or attempting to run away, the driver can instantly release the horse from the vehicle by simply pulling upon the rod 39 which will actuate the system of levers and force the sleeves 26—27 outwardly, and simultaneously detach the thongs from the apertures through the action of the forked ends of the outer levers and throw the traces free of the swingle-tree, and thus detach the horse.

The device may be employed for disconnecting the horse under ordinary conditions when it is desired to release the animal, the releasing device being more convenient than those usually employed. By providing the harness with lines of more than usual length, the driver can remain in the vehicle, release the horse, and permit the horse to walk out from between the shafts.

The rods may be of metal as light as necessary consistent with the strains to which they will be subjected, and may be applied with slight and immaterial modifications to vehicles of different sizes, and is equally applicable to the lightest buggies or the heaviest draft vehicles, and may be applied with slight and immaterial modifications to two horses as well as to a single horse.

What is claimed, is:—

1. The combination with a swingle-tree adapted to support draft traces having perforations at the ends, sleeves slidable over the swingle-tree, rods connected to said sleeves and extending over said perforations and with forked terminals, flexible members connected to said swingle-tree and extending through the forks of said rods and also through the apertures of the swingle-tree, and means under the control of the driver for moving said rods longitudinally of the swingle-tree.

2. The combination with a vehicle including a swingle-tree with the ends of the swingle-tree adapted to receive draft traces, members movably engaging the swingle-tree and adapted when actuated to force said traces from engagement with the swingle-tree, inner rods pivoted intermediate their ends to said swingle-tree and with their inner ends overlapping, outer rods pivoted at their ends respectively to the outer ends of said inner rods and to said movable members, a pull rod movably engaging the overlapping portions of said inner rods and leading to the vehicle body, and means under the control of the driver for actuating said pull rod.

3. The combination with a vehicle including a swingle-tree having the ends adapted to receive traces, members engaging the swingle-tree and adapted when actuated to force said traces from engagement with the swingle-tree, inner rods pivoted intermediate their ends to said swingle-tree and with their inner ends overlapping, outer rods pivoted at their ends respectively to the outer ends of said inner rods and to said movable members, a guide device connected centrally to said swingle-tree, a rod movably engaging said guide device and likewise movably engaging the overlapping portions of said inner rods and leading to the vehicle body, and means under the control of the driver for actuating said pull rod.

4. The combination with a vehicle including a swingle-tree provided with means at the ends for receiving traces, sleeves slidable upon said swingle-tree, inner rods pivoted intermediate their ends to said swingle-tree and with their inner ends overlapping, outer rods pivoted at their ends respectively to the outer ends of said inner rods and to said sleeves, a pull rod movably engaging the overlapping portions of said inner rod and leading to the vehicle body, and means under the control of the driver for actuating said pull rod.

5. The combination with a vehicle including a swingle-tree having perforations at the ends, flexible thongs connected at one end to the swingle-tree and with the other end projecting through the apertures outside the traces, sleeves slidably engaging said swingle-tree inside the traces, inner rods pivoted intermediate their ends to said swingle-tree with their inner ends overlapping, outer rods pivoted at their inner ends respectively to the outer ends of said inner rods and pivotally engaging said sleeves and extending beyond the same and with their free ends forked and adapted to receive said thongs, and a pull rod movably engaging the overlapping ends of said inner rods and extended to a point convenient to the driver in the vehicle, said rods being so disposed as to maintain the sleeves and the forked portions of the rods in inoperative position, and adapted to detach the thongs and dislodge the traces when the pull rod is actuated.

In testimony whereof, I affix my signature, in presence of two witnesses.

JESSE J. HARPER.

Witnesses:
J. D. Ross,
F. E. Byrd.